United States Patent [19]

Wong

[11] 4,277,832
[45] Jul. 7, 1981

[54] FLUID FLOW CONTROL SYSTEM

[75] Inventor: Thomas Y. Wong, Schenectady, N.Y.

[73] Assignee: General Electric Company, Schenectady, N.Y.

[21] Appl. No.: 80,197

[22] Filed: Oct. 1, 1979

[51] Int. Cl.³ .................... G06F 15/20; G01F 1/34
[52] U.S. Cl. ............................ 364/510; 73/861.42; 137/487; 137/624.11; 364/116
[58] Field of Search ............... 364/111, 116, 509, 510, 364/494; 73/195, 205 R; 137/38, 624.11, 624.13, 487

[56] References Cited

U.S. PATENT DOCUMENTS

| Re. 29,383 | 9/1977 | Gallatin et al. | 364/510 |
|---|---|---|---|
| 3,225,179 | 12/1965 | Chestnut et al. | 364/116 |
| 3,739,159 | 6/1973 | Nalley | 364/510 |
| 3,866,108 | 2/1975 | Yannone et al. | 322/14 |
| 3,878,376 | 4/1975 | Sholes, Jr. et al. | 364/509 |
| 4,053,746 | 10/1977 | Braytenbah et al. | 364/494 |
| 4,099,237 | 7/1978 | Zitelli et al. | 364/494 |
| 4,197,576 | 4/1980 | Sanchez | 364/116 |

OTHER PUBLICATIONS

Collins; "Using Multiplier IC's to Determine Flow Characteristics"; Control and Instrumentation; Oct. 1974; pp. 38–39.

Primary Examiner—Errol A. Krass
Attorney, Agent, or Firm—Jerome C. Squillaro

[57] ABSTRACT

A fluid flow control system for controlling the flow of fluid through a valve is disclosed. The control system controls the flow of fluid through the valve by varying the position of the valve. The control system performs this function in such a manner that the change in position of the valve at all times remains sufficiently bounded so as to ensure that the actual flow of fluid through the valve is substantially equal to the flow predicted by the static flow equation for the valve.

21 Claims, 6 Drawing Figures

FLUID FLOW CONTROL SYSTEM

BACKGROUND OF THE INVENTION

The present invention relates generally to fluid control systems and more particularly towards a fuel control system for gas turbine applications. The single most important function in such systems is their reliability. The petro-chemical industry utilizing gas turbines requires liquid fuel systems which operate continually for up to three years. Such systems also require accurate and fast control loops to ensure proper operation of the gas turbines.

The control system of the present invention utilizes a programmed microprocessor to control fuel flow as a function of various parameters by adjusting the position of a valve supplying fuel to the gas turbine. Computer based systems of the foregoing type have previously been disclosed in the following U.S. patents: U.S. Pat. No. 3,866,108; U.S. Pat. No. 4,053,746; and U.S. Pat. No. 4,099,237. While these control systems have been somewhat successful, they are quite complicated and are highly expensive. The primary object of the present invention is to provide a computer based fluid flow control system which is simpler, less expensive and more accurate than the prior art systems.

BRIEF DESCRIPTION OF THE INVENTION

In order to achieve the foregoing and other objects of the present invention, the fluid flow system of the present invention comprises:

(A) a fluid control valve, the flow of fluid through said valve varying as a function of the position of said valve;

(B) valve adjust means for adjusting the position of said control valve as a function of a valve position signal applied thereto; and (C) control means for generating a new said valve position signal during each of a plurality of sampling instants N, said control means generating said valve position signal by (1) computing, during each successive time interval, the flow of fluid through said valve as a function of the position of said valve during the time interval N and in accordance with the static flow equation for said valve; and (2) generating said new valve position signal as a function of the difference between a desired flow and said computed flow and in accordance with a non-linear control transfer function which limits said valve position signal, and therefore limits the change in position of said valve between said present sampling interval N and the following sampling interval N+1, to a value which ensures that the actual rate of flow through said valve during said following sampling interval N+1 is substantially equal to the flow predicted by said static flow equation.

As a result of the foregoing, the microprocessor control means of the present invention controls the position of the fluid control valve utilizing only the static flow equation for the valve and forces the valve to operate in a quasi static mode by merely limiting the permissible change in valve position during any given sampling interval. This is extremely desirable since it reduces the number of calculations which must be made by the microprocessor and thereby optimizes the speed of response of the flow control loop.

In the preferred embodiment, the valve adjust means comprises a hydraulic piston and a servo valve which controls the flow of piston fluid into and out of the piston. The output shaft of the hydraulic piston is coupled to the control lever of the valve and mechanically adjusts the position of the valve. The servo valve adjusts the extension of the piston arm of the hydraulic piston, and therefore adjusts the valve position as a function of the valve position signal generated by the control means. The control means is preferably a microprocessor which periodically samples the pressure differential across the valve and the position of the valve and determines the fuel flow as a function of these signals and in accordance with the static flow equation for the valve. After determining the fuel flow, the microprocessor generates the valve position signal in accordance with the above-noted non-linear control transfer function.

In accordance with this embodiment of the invention, all integration in the control loop takes place in the hydraulic piston outside of the microprocessor. This is highly desirable since it permits the control algorithm carried out by the microprocessor to be non-recursive (that is, the output of the microprocessor is a function only of past and present inputs). In this application, the non-recursive algorithm in the microprocessor produces a perfect pole zero cancellation in the control loop. The effect of this pole zero cancellation also simplifies the analysis of non-linear elements in the position loop.

BRIEF DESCRIPTION OF THE DRAWINGS

For the purpose of illustrating the invention, there are shown in the drawings several embodiments which are presently preferred; it being understood, however, that this invention is not limited to the precise arrangements and instrumentalities shown.

DETAILED DESCRIPTION OF THE PREFERRED EMBODIMENT

Figure 1:
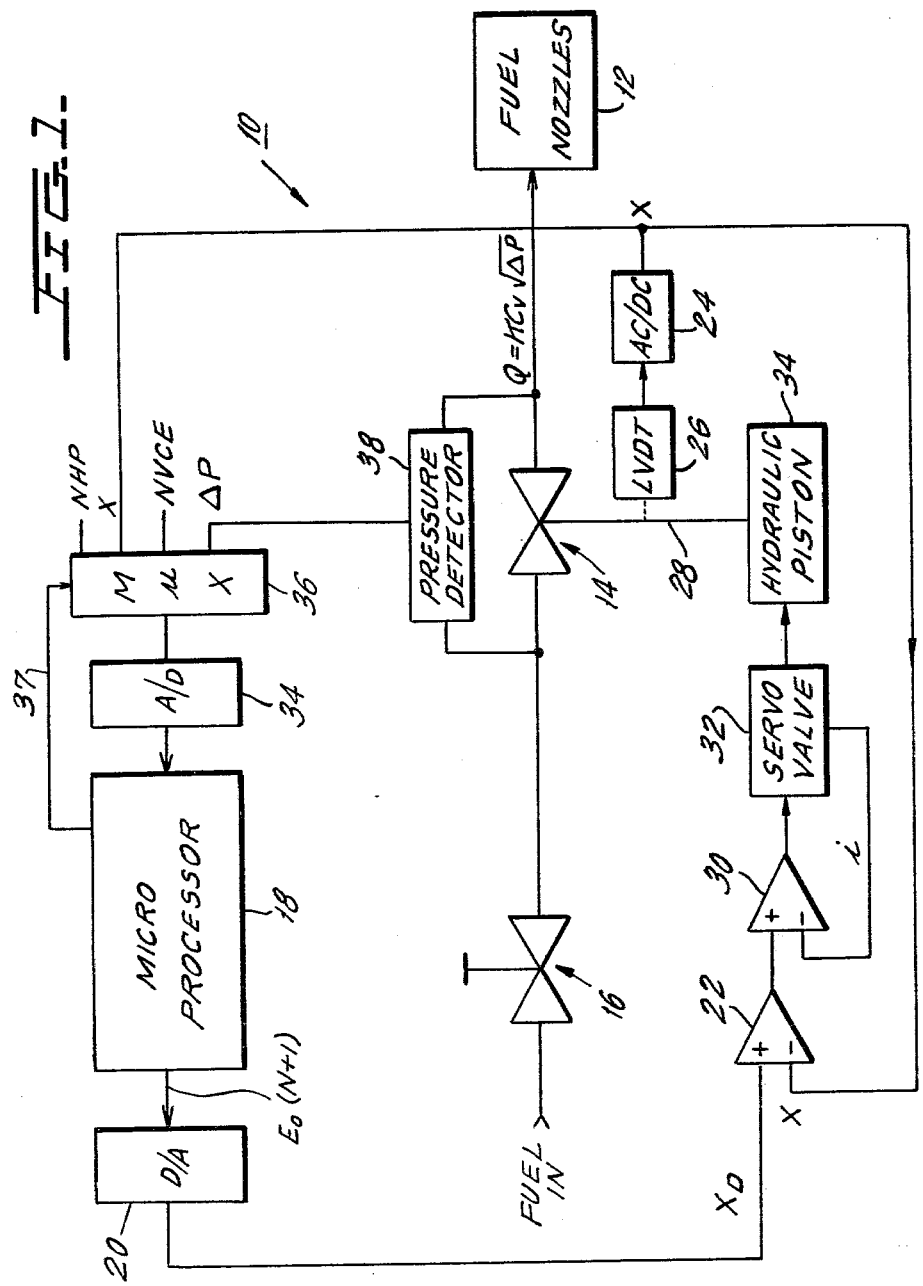
FIG. 1 is a block diagram of a fluid flow control system constructed in accordance with the principles of the present invention.

Referring now to the drawings, wherein like numerals indicate like elements, there is shown in FIG. 1 a block diagram of a flow control system constructed in accordance with the principles of the present invention and designated generally as 10. Flow control system 10 controls the flow of fuel flowing into the fuel nozzles 12 of a gas turbine (not shown). The flow Q of fuel into the fuel nozzles 12 is controlled by controlling the position of a control valve 14 which receives fuel from a fuel supply (not shown) via a stop valve 16. Stop valve 16 is normally in a fully open position but may be manually or automatically closed whenever fuel flow is to be totally cut off.

The fuel flow Q through the valve 14 will vary as a function of both the position of the valve (which position may vary from the fully open to the fully closed position) and the pressure across the valve in accordance with the following dynamic flow equation:

$$Q(S) = X(S) \cdot K_o \sqrt{\frac{\Delta P}{\rho}} \cdot a \cdot x \left[ 1 - K_1 \cdot \frac{x}{\Delta P} \left| \frac{\partial \Delta P}{\partial x} \right| \right] \quad (1)$$

wherein Q(S) is the Laplace transform of the instantaneous flow through valve 14, X(S) is the Laplace transform of the instantaneous position of valve 14, $\Delta P$ is the pressure differential across valve 14, $\rho$ is the density of the fuel passing through valve 14, x is the instanteous position of valve 14 and K0, K1 and $\alpha$ are constants which must be determined experimentally as a function of the geometry of the particular valve 14 being used.

As made clear from the foregoing dynamic flow equation, fuel flow through valve 14 varies as a function of the pressure $\Delta P$ across valve 14, the position x of the valve 14 and the density $\rho$ of the fuel passing through valve 14. Accordingly, fuel flow can be controlled by adjusting the position of the valve 14 as a function of these variables. In most applications, the density $\rho$ of the fuel may be considered to be constant. Accordingly, the embodiments of the invention illustrated herein assume that fuel density is constant and therefore neither measure this value nor adjust the position of valve 14 as a function thereof. If changes in fuel density become sufficiently critical, appropriate sensors may be added to the system to permit the controller to adjust the valve position as a function of this variable.

While the foregoing dynamic flow equation is true for all operations of valve 14, it is somewhat complex and requires prior knowledge of the partial differential $\partial \Delta P/\partial x$. During steady state operation (when the valve position x is constant and all transients have terminated) $X(S)=x/S$, the partial differential $\partial \Delta P/\partial x=0$, and the dynamic flow equation (1) is reduced to the following static flow equation:

$$Q_{ss} = K \cdot C_v \sqrt{\Delta P} \quad (2)$$

wherein $K = K_o/\sqrt{\rho}$ and Cv is the effective flow area of valve 14. The effective area Cv of valve 14 varies as a function of the valve position x in approximately the following manner:

$$Cv = a \cdot x^2 \quad (3)$$

wherein $\alpha$ is as defined above. Equation (2) is significantly simpler than dynamic equation (1), but is precisely accurate only for steady state flow. As the rate of change in flow increases, the static equation becomes increasingly inaccurate since the size of the right hand term $$K_1 \cdot x/\Delta P \; \partial \Delta P/\partial x$$

of equation (1) becomes increasingly non-linear. On the other hand, as long as the change in flow rate remains finite, the right hand term of equation (1) remains bounded (i.e., within a predetermined range) and the static flow equation remains predictable. Since the change in the rate of flow is directly related to the rate of change in the position of valve 14, the static flow equation will remain true as long as the rate of change in the valve position remains bounded. The fuel control system 10 of the present invention utilizes this fact to maintain the fuel flow through valve 14 at a desired rate by calculating only the steady state flow equation (2) and by limiting the permissible change $\Delta x$ in the position of valve 14 during any time interval to a preselected value which will cause the static flow equation to remain quasi true at all times. Stated otherwise, the value $\Delta x$ is limited to a value which ensures that the actual rate of flow through the valve remains substantially equal to the flow predicted by the static flow equation. In this manner, the fuel control system 10 of the present invention forces valve 14 to operate as if it is always in the steady state condition by merely limiting the permissible change in the position of the valve during any given time interval. This is extremely significant since it both reduces the number of calculations which must be made to determine actual flow rate, thereby optimizing the response time of the control loop, and speeds up the computation routine.

The heart of flow control system 10 is a microprocessor 18 which samples the variables $\Delta P$ and x during each of a plurality of sampling intervals N and generates an output control signal Eo (N+1) which is a digital representation of the desired position of the valve 14 during the next sampling interval N+1. As will be explained in greater detail below, the particular value of the control signal Eo (N+1) is determined by the pressure $\Delta P$ across valve 14, the instantaneous position x of the valve 14 and the desired fuel flow $Q_D$ through valve 14. The desired value $Q_D$ of fuel flow is determined by speed and fuel reference signals NHP, NVCE, respectively, whose functions will also be described below.

The control signal Eo (N+1) generated by microprocessor 18 is applied to digital-to-analog converter (hereinafter D/A converter) 20 which generates an analog output signal $x_D$ which is indicative of the desired position of valve 14 during the sampling interval N+1. The signal $x_D$ is applied to the non-inverting input terminal of difference amplifier 22 whose inverting input terminal receives an analog signal x which is indicative of the actual instantaneous position of valve 14. Signal x is generated by an AC/DC converter 24 which receives an AC input signal from a linear variable differential transformer (hereinafter LVDT) 26 which monitors the position of a piston shaft 28. Piston shaft 28 is coupled to the control lever of valve 14 and mechanically controls the position of valve 14. The linear AC voltage generated by LVDT 26 varies as a function of the position of shaft 28 and is converted to a DC signal x which is representative of the instantaneous valve position by AC/DC converter 24. Difference amplifier 22 compares the signals $x_D$ and x and generates an output signal representative of the difference between the desired valve position $x_D$ and the actual valve position x and therefore indicative of the required change in the valve position. The output of difference amplifier 22 is coupled to the noninverting input terminal of a second difference amplifier 30 which provides transient feedback compensation to locally stabilize the current in the position loop. This is affected by feeding a current feedback signal i from servo valve 32 to the inverting input terminal of difference amplifier 30. The output of amplifier 30 is applied to the control input of servo valve 32 and causes servo valve 32 to adjust its position as a function of the difference signal appearing at the output of difference amplifier 22.

Servo valve 32 controls the supply of fluid into hydraulic piston 34, and thereby controls the position of piston shaft 28 and valve 14. Whenever there is a difference between the desired position signal $x_D$ and the actual position signal x, difference amplifier 22 generates a positive or negative output signal which causes servo valve 32 to either add fluid to or remove fluid from hydraulic piston 34. This causes the position of piston shaft 28 to move in the proper direction until the actual position x of valve 14 is equal to the desired position $x_D$.

In addition to being applied to the inverting input terminal of difference amplifier 22, the position signal x is applied to a multiplexer 36 which also receives a pressure differential signal $\Delta P$ (generated by pressure detector 38 and indicative of the pressure differential across the valve 14), a fuel reference signal NVCE and a turbine speed signal NHP. Multiplexer 36, whose operation is controlled by microprocessor 18 via control line 37, sequentially applies the signals $\Delta P$, x, NHP and NVCE to analog-to-digital converter 34 (hereinafter A/D converter 34) when commanded to do so. As these signals are applied to A/D converter 34, they are converted to digital signals and applied to the input of microprocessor 18.

Figure 2:
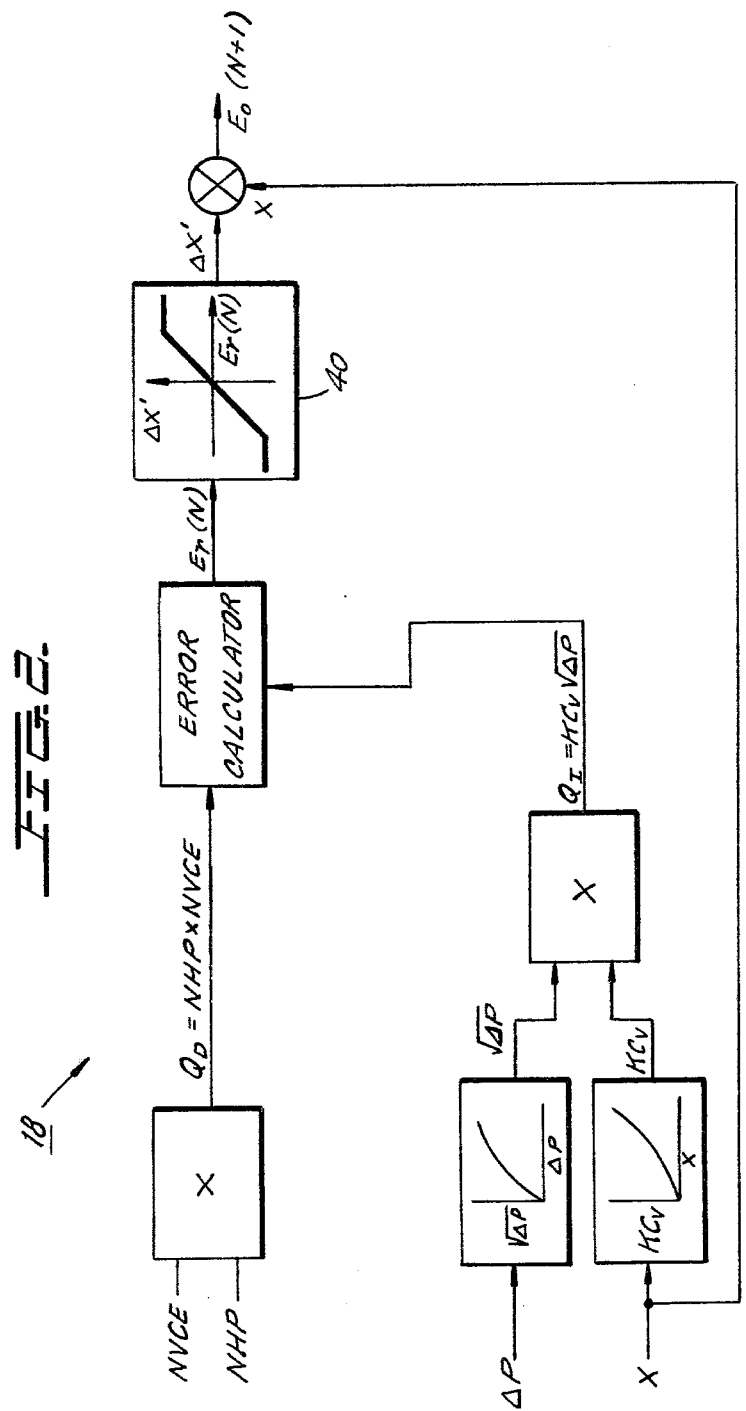
FIG. 2 is a functional block diagram illustrating the operations carried out by the microprocessor of FIG. 1.

The operation of microprocessor 18 may best be understood with reference to FIG. 2 which is a functional block diagram illustrating the operations carried out by microprocessor 18. As shown therein, microprocessor 18 generates a desired flow signal $Q_D$ by multiplying the speed signal NHP by the reference fuel flow signal NVCE. The reference fuel flow signal NVCE is generated by an external source (such as a throttle) and is indicative of the desired fuel flow to the turbine fed by fuel nozzles 12. The actual fuel flow to the turbine will vary, however, as a function of the instantaneous speed of the turbine. To compensate for this factor, the fuel reference signal NVCE is multiplied by the speed signal NHP which is representative of the instantaneous speed of the turbine. The product $Q_D$ of these two signals is therefore indicative of the desired fuel flow.

In addition to generating the desired fuel flow signal $Q_D$, microprocessor 18 generates the instantaneous fuel flow signal $Q_I$ which is representative of the actual instantaneous fuel flow during the present sampling interval N. In accordance with the present invention, this signal is generated using static flow equation (2). In order to generate this value, microprocessor 18 determines the value $\sqrt{\Delta P}$ by interpolation using a lookup table in the form of a Read Only Memory (ROM) which stores a discrete plurality of values $\sqrt{\Delta P}$ for a corresponding discrete plurality of values of $\Delta P$. In a similar manner, microprocessor 18 generates the value KCv from the input signal x utilizing a similar lookup table. These two values ($\sqrt{\Delta P}$ and KCv) are then multiplied to obtain the instantaneous flow signal $Q_I$.

The desired flow signal $Q_D$ is then subtracted from the instantaneous flow signal $Q_I$ to produce an error signal Er(N) indicative of the desired change in flow through valve 14 during the next sampling interval N+1. This signal is then converted to a value $\Delta x$ representative of the permissive change in the position of valve 14 during the next sampling interval N+1. If the instantaneous flow signal $Q_I$ had been derived from the dynamic flow equation (1) rather than the steady state flow equation (2), the signal $\Delta x$ could be generated as a straight proportional function of the error signal Er(N) (that is, $\Delta x = KEr(N)$). Since the instantaneous flow signal $Q_I$ is, in fact, derived from the static flow equation (2), the signal $\Delta x$ must be limited so as to ensure that static flow equation (2) remains quasi true for all values of $\Delta x$. To this end, computer 18 generates $\Delta x$ in accordance with a nonlinear transfer function which limit checks the value of $\Delta x$ so as to ensure that static equation (2) remains true. The non-linear control transfer function is illustrated generally by the block 40 of FIG. 2 and may better be understood with reference to FIG. 3.

Figure 3:
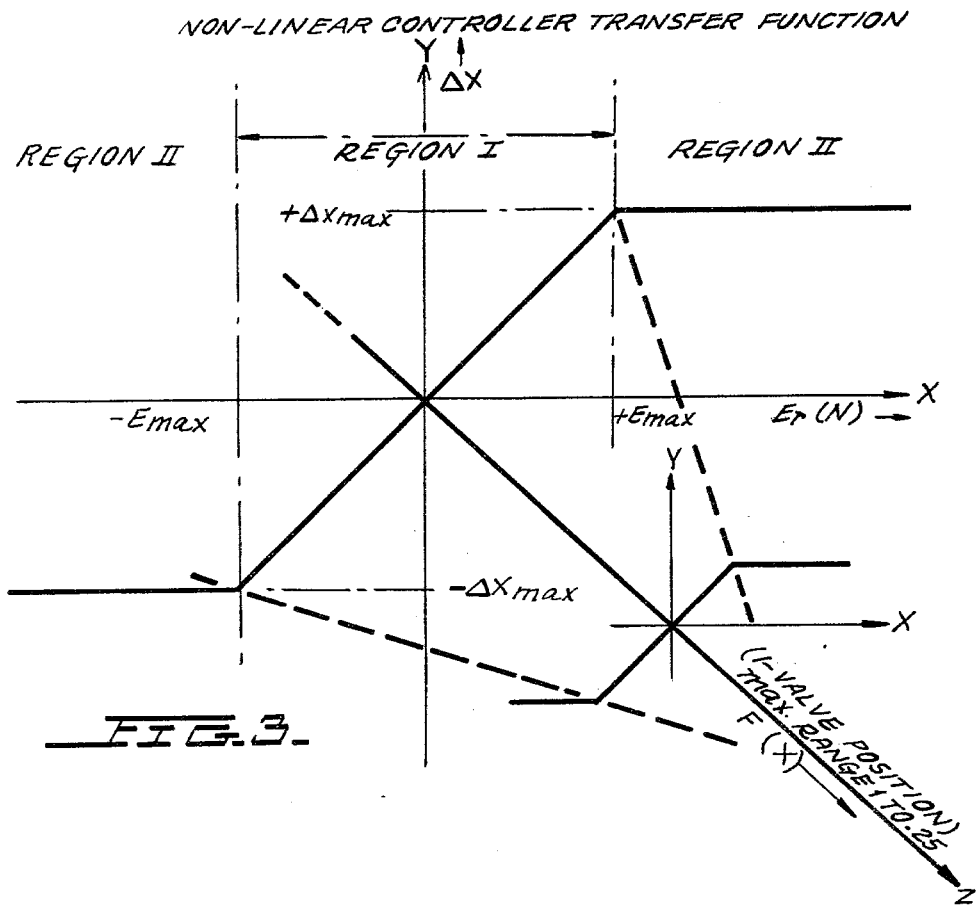
FIG. 3 is a three-dimensional graph illustrating the non-linear control transfer function used by the microprocessor of FIG. 1.

As shown in FIG. 3, the non-linear control transfer function determines the value $\Delta x$ (plotted on the Y-axis) as a function of both the magnitude of the error signal Er(N) (plotted on the X-axis) and the position x of the valve (plotted on the Z-axis). The non-linear control transfer function has two regions; a linear region I and a velocity limit region II. The limits of the linear region are determined experimentally as a function of the geometry of the particular valve being used and indicate the maximum change in valve position ($+\Delta x_{max}$, $-\Delta x_{max}$) which is permissible for a given valve position x so as to ensure that the fuel flow Q through the valve 14 substantially follows the static flow equation (2). In determining these limits, the engineer must be careful to limit the rate of change in the valve geometry (which rate of change varies as a function of the rate of change of valve position $\Delta x$) to maintain stability in the control loop (microprocessor 18, amplifier 22, 30, servo valve 32 and hydraulic piston 34) as well as transient stability in fuel flow.

The non-linear transfer function will first be described in terms of only the X and Y dimensions of FIG. 3. A description of the manner in which the Z dimension affects this function will follow. When the error signal Er(N) is in the region I area, the incremental change $\Delta x$ in the valve position is calculated in accordance with the following equation:

$$\Delta x = K_I \cdot T \cdot Er(N) \tag{4}$$

wherein T is the length of the sampling interval of microprocessor 18 and $K_I$ is an integration constant. The constant $K_I$ is also determined experimentally to ensure that the change in valve position $\Delta x$ (and therefore the change in flow Q) during the succeeding sampling interval N+1 will remain sufficiently bounded to ensure that the steady state flow equation (2) remains quasi true.

Whenever the error signal Er(N) is greater than +Emax or less than −Emax, the transfer function is in velocity limit region II and the desired change $\Delta x$ in the position of control valve 14 during the next sampling interval N+1 is calculated in accordance with the following equations:

$$\Delta x = +\Delta x_{max} \quad \text{for } Er(N) > +E\text{max} \tag{5}$$

or $$\Delta x = -\Delta x_{max} \quad \text{for } Er(N) < -E\text{max} \tag{6}$$

While the single curve illustrated on the X-Y axis of FIG. 3 is proper when the valve position is fully closed during the present sampling interval N, it would be improper for other valve positions. As the opening of the valve position increases, the instantaneous flow Q increases in a non-linear manner. As flow increases, the permissible change in flow, and therefore the permissible change $\Delta x$ in the position of the valve also decreases. This fact is taken into account by the third dimension Z of the non-linear transfer function of FIG. 3.

As noted above, the position x of valve 14 is plotted on the Z-axis of FIG. 3. This axis has the effect of reducing the size of the desired incremental change $\Delta x$ in valve position as a direct function of the position of the valve 14. More particularly, this axis is used to compute a new value:

$$\Delta x' = Kn \cdot \Delta x \qquad (7)$$

wherein Kn is defined as:

$$Kn = (1 - x') \qquad (8)$$

and x' represents the instantaneous valve position x and preferably varies from the value 0 when the value is fully closed and the value 0.75 when the valve is fully open. Other limits of x' may, however, be used. As a result of the introduction of the factor Kn, equations (4)-(6) above are more properly expressed as follows:

$$\Delta x' = [K_I \cdot T \cdot Er(N)] \cdot Kn \quad \text{for}$$
$$-E\text{max} \leq Er(n) \leq +E\text{max} \qquad (4')$$

$$\Delta x' = +Kn \cdot \Delta x_{max} \quad \text{for } Er(N) > +E\text{max} \qquad (5')$$

$$\Delta x' = -Kn \cdot \Delta x_{max} \quad \text{for } Er(N) < -E\text{max} \qquad (6').$$

In summary, microprocessor 18 generates $\Delta x$ in accordance with equation (4') whenever Er(N) is either less than or equal to $+E\text{max}$ or greater than or equal to $-E\text{max}$ and generates $\Delta x$ in accordance with equations (5') and (6') whenever Er(N) is greater than or less than $+E\text{max}$ and $-E\text{max}$, respectively.

In the present embodiment, the permissible maximum positive and negative values, and therefore the maximum positive and negative valve changes $+\Delta x_{max}$ and $-\Delta x_{max}$ have been assumed to be equal. Different values of the positive maximum value $+E\text{max}$ and the negative maximum value $-E\text{max}$ may, however, be utilized if experimental results indicate that such a difference is desirable.

Returning again to FIG. 2, after microprocessor 18 determines the desired change $\Delta x'$ in the position of valve 14 during the next sampling instant N+1, it adds the incremental value $\Delta x'$ to the present valve position x so as to arrive at the command signal:

$$Eo(N+1) = x + \Delta x' \qquad (9).$$

The process is then repeated at the beginning of the next sampling interval N+1.

In the foregoing discussion, the operation of microprocessor 18 has been described with reference to the functional block diagram of FIG. 2. A somewhat more accurate representation of the operation of microprocessor 18 may be described with reference to FIG. 4 which illustrates a flow chart for the program controlling the operation of microprocessor 18.

Figure 4:
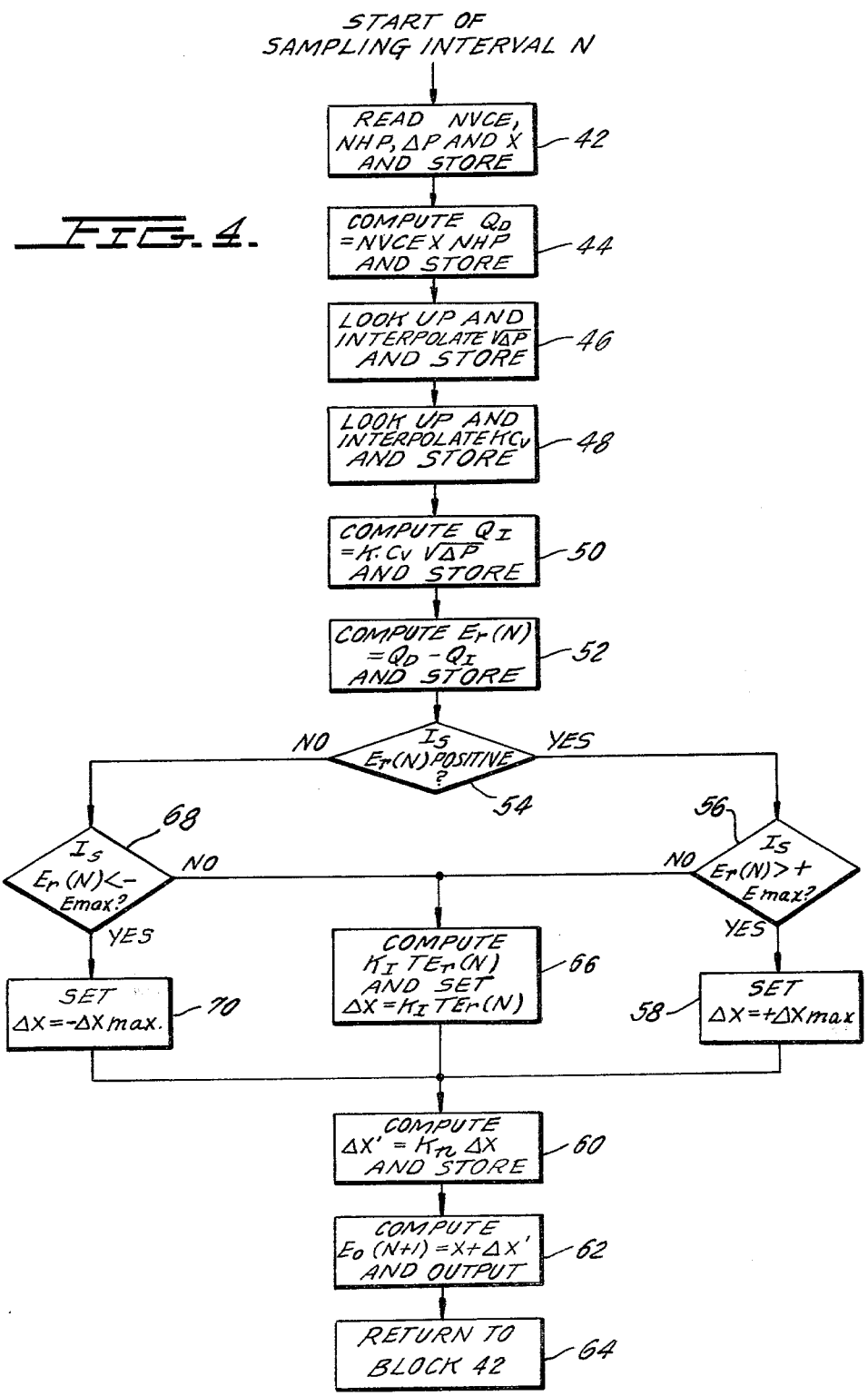
FIG. 4 is a flow chart of the program carried out by the microprocessor of FIG. 1.

The flow chart illustrated in FIG. 4 represents the various steps taken by microprocessor 18 during a single sampling interval. This operation is repeated for each successive sampling interval. As shown in block 42, at the beginning of the sampling interval N, microprocessor 18 sequentially reads the reference fuel signal NVCE, the speed signal NHP, the pressure differential signal $\Delta P$ and the position signal x by causing multiplexer 36 to sequentially apply these signals to A/D converter 34. As these signals are applied to the input port of the microprocessor, they are stored in appropriate memory locations of the microprocessor 18. Microprocessor 18 then computes the desired fuel flow $Q_D$ from the stored values NVCE and NHP. See block 44.

After computing the desired fuel flow $Q_D$, microprocessor 18 interpolates the value $\sqrt{\Delta P}$ from the stored value $\Delta P$ utilizing an appropriate lookup table. This value is then stored for later use. A similar process is carried out with respect to the valve position signal x wherein the value KCv is also interpolated using an appropriate lookup table and stored. See blocks 46 and 48. Thereafter, microprocessor 18 computes the instantaneous fuel flow $Q_I$ in accordance with equation (2) and stores this value as shown in block 50. Thereafter, the error signal Er(N) is computed and also stored. See block 52.

After computing the error signal Er(N), microprocessor 18 determines if the error signal is positive or negative. See decisional block 54. If it is positive, the program continues at decisional block 56 and determines if the error signal Er(N) is greater than the maximum error value $+E\text{max}$. If it is, the program proceeds to block 58 and sets the value $\Delta x$ equal to $+\Delta x_{max}$. Thereafter, microprocessor 18 computes the desired change $\Delta x'$ in the position of valve 14 in accordance with equation (7) (see block 60), computes the control signal Eo (n+1) in accordance with equation (9), applies this signal to D/A converter 20 (see block 62), and thereafter returns to the portion of the program corresponding to block 62. The program is then reinitiated at the start of the next sampling interval N+1.

Returning to decisional block 56, if microprocessor 18 determines that the error value Er(N) is less than or equal to the positive maximum error $+E\text{max}$, the program proceeds to block 66 wherein the value $\Delta x$ is computed in accordance with equation (4') and $\Delta x$ is set equal to this value. At this time, the program proceeds with blocks 60-64 as described above.

Returning to decisional block 58, if microprocessor 18 determines that the error signal Er(N) is negative, the program proceeds to decisional block 68 and microprocessor 18 determines if the negative error signal Er(N) is less than the negative maximum value $-E\text{max}$. If it is, the program proceeds to block 70 and sets $\Delta x$ equal to $-\Delta x_{max}$. Thereafter, the program proceeds through blocks 60-64 as described above. On the other hand, if microprocessor 18 determines that the negative error signal Er(N) is not less than the negative minus value $-E\text{max}$, the program proceeds through blocks 66 and 60-64 as described above.

Figure 6:
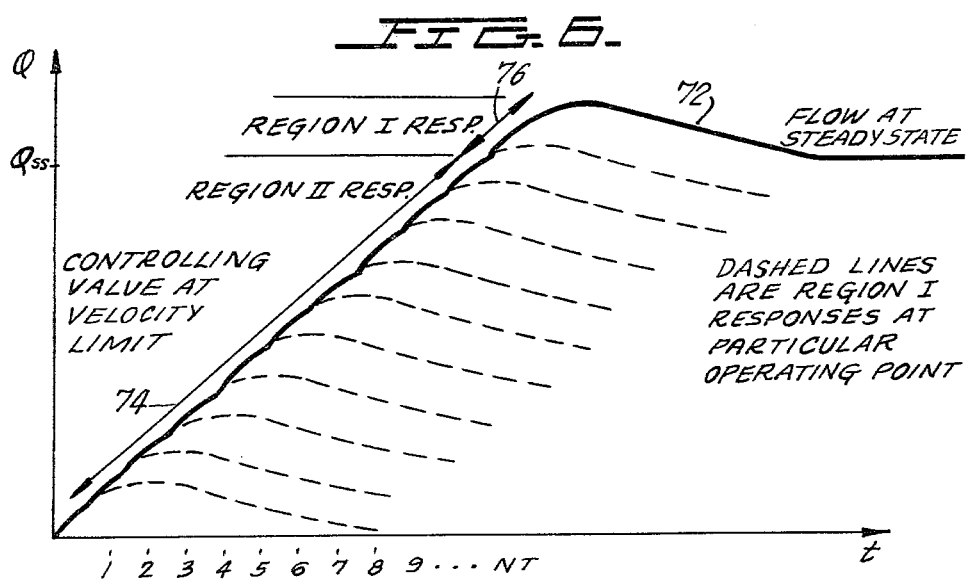
FIG. 6 is a graph illustrating the response curves of fuel flow for different values of desired fuel flow.

Sample response curves for the control system of the present invention are illustrated in FIG. 6. The solid curve 72 illustrates the manner in which the flow Q increases from 0 to the desired steady state value Qss. The first portion of this curve, identified by line 74, is the region II response and is substantially a straight line curve. Once the actual flow has become sufficiently close to the desired flow, the response curve enters region I and follows the path falling within line 76 until the flow has reached the steady state level. The dashed lines in FIG. 6 represent the region I response of the system for different desired steady state values of flow.

In the foregoing embodiment, a single microprocessor 18 controls the operation of a single valve 14. In order to improve the reliability of the control system, however, it is preferable to use a plurality of parallel operating microprocessors which control a plurality of control valves. One such embodiment is illustrated in FIG. 5.

As shown therein, fuel control system 10' includes three parallel microprocessors 18, 18' and 18" which control the operation of two parallel control valves 14A, 14B. Fue flow Qin is fed to the control valves 14A and 14B in parallel from a common fuel source. The separate fuel flows $Q_A$ and $Q_B$ appearing at the output of control valves 14A and 14B, respectively, are applied to the fuel nozzles (not shown) of the gas turbine. Since the fuel reference NVCE and speed NHP inputs to the parallel microprocessors 18-18" are representative of the total desired fuel flow to the turbine, microprocessors 18-18" control the position of control valves 14A and 14B in such a manner that the flow through each control valve is normally ½ the total desired flow to the turbine. If, however, either control valve malfunctions, microprocessors 18-18" automatically shut off the improperly operating control valve and adjust the position of the remaining control valve to permit it to supply the full amount of fuel required by the turbine.

Figure 5:
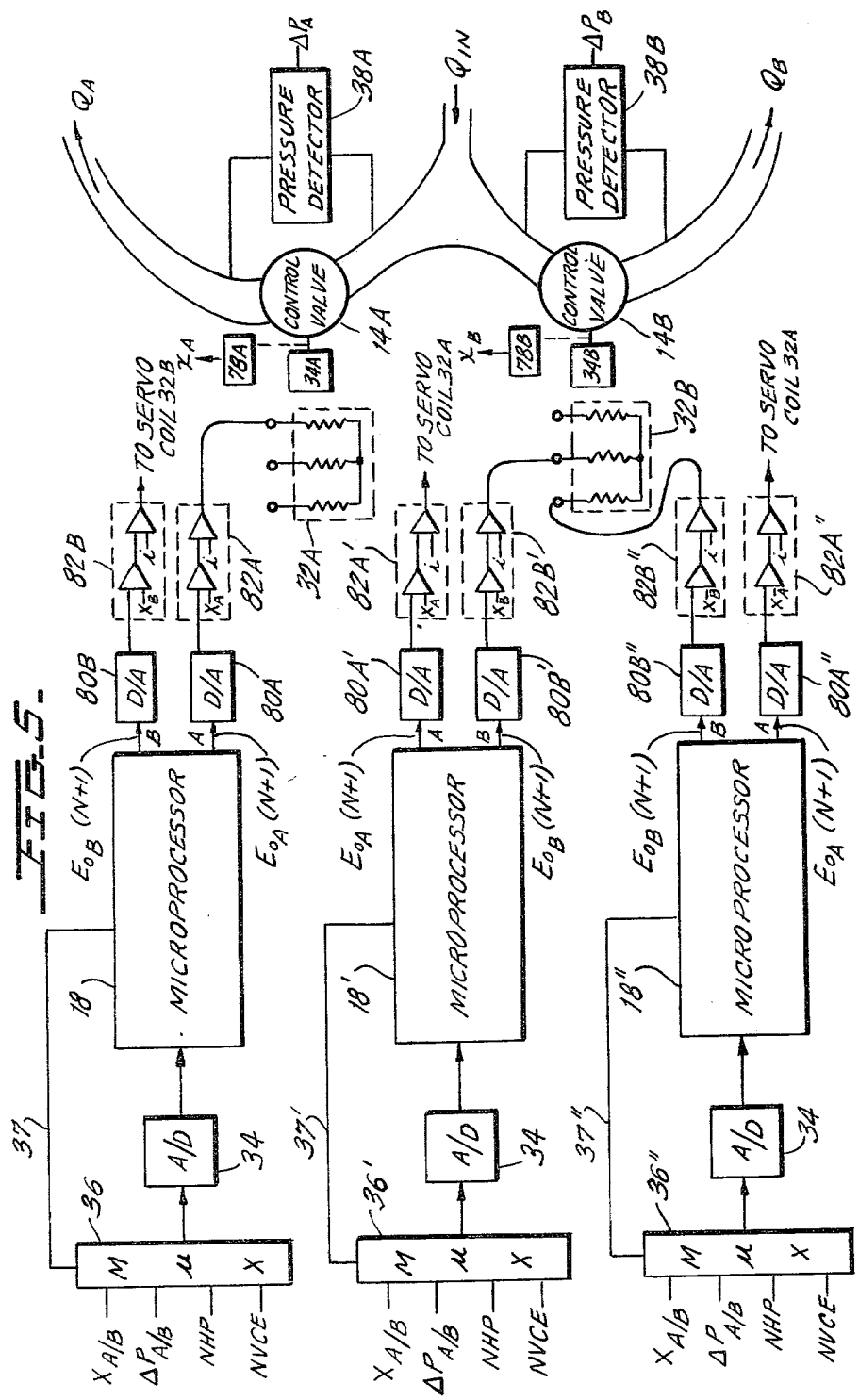
FIG. 5 is a block diagram of a second embodiment of a fluid flow control system constructed in accordance with the principles of the present invention.

As shown in FIG. 5, the position of each control valve 14A, 14B is mechanically controlled by a respective hydraulic piston 34A, 34B. Additionally, each control valve includes its own sensors 38A, 78A and 38B, 78B which determine the position of and the pressure across the respective control valves. Sensors 78A, 78B each include an LVDT and an AC/DC converter which are equivalent to LVDT 26 and AC/DC converter 24 of FIG. 1. Sensors 38A, 38B are identical to pressure detector 38 of FIG. 1.

Each microprocessor 18-18" samples both the pressure differential and the position signals for each of the control valves 14A, 14B during each sample interval N and sequentially generates control signals $E_{oA}(N+1)$ and $E_{oB}(N+1)$ at its A and B outputs, respectively. Control signal $E_{oA}(N+1)$ indicates the desired position of valve 14A and is applied to one of the parallel connected coils of servo valve 32A. Control signal $E_{oB}(N+1)$ indicates the desired position of valve 14B and is applied to one of the coils of servo drive 32B. Servo valves 32A and 32B are identical to servo valve 32 of FIG. 1 with the exception that they include three control coils instead of one. Each of the coils receives one of the control outputs from each of the microprocessors 18-18". As such, the operation of servo valves 32A and 32B, and therefore the position of control valves 14A and 14B, respectively, will be determined by the combined output of the three microprocessors 18-18". Particularly, the three control signals $E_{oA}(N+1)$ generated by microprocessors 18-18" will be applied to and averaged by the three coils of servo valve 32A while the three control signals $E_{oB}(N+1)$ generated by microprocessors 18-18" will be applied to and averaged by the three coils of servo valve 32B.

The operation of each microprocessor 18-18" is identical. Accordingly, only the operation of microprocessor 18 will be described.

At the beginning of each successive sampling interval N, microprocessor 18 causes multiplexer 36 to sequentially read in the values $x_A$, $\Delta P_A$ followed by the values $x_B$, $\Delta P_B$, followed by the speed and fuel reference signals NHP and NVCE, respectively. After these signals have been read into microprocessor 18, microprocessor 18 sequentially performs the calculations described with reference to FIGS. 2 and 4, supra, on both the inputs $x_A$, $\Delta P_A$ and the inputs $x_B$, $\Delta P_B$. As such, separate control signals are independently generated for each valve 14A, 14B. The two control signals $E_{oA}(N+1)$ and $E_{oB}(N+1)$ are applied to the A and B outputs of microprocessor 18, respectively.

The signals appearing at the A and B outputs of microprocessor 18 are applied to D/A converters 80A and 80B, respectively, wherein they are converted to analog signals and applied to servo drive circuits 82A and 82B, respectively. Each servo drive circuit 82A, 82B is identical in structure and function to the difference amplifiers 22, 30 of FIG. 1. The output of servo drive 82A is applied to a respective one of the coils of servo valve 32A while the output of servo drive 82B is applied to a respective one of the coils of servo valve 32B.

Each of the microprocessors 18-18" carry out the steps noted with respect to microprocessor 18. The operations of the three microprocessors are, however, independent, thereby increasing the reliability of the system.

While the present invention has been disclosed with particular reference to a flow controller for a gas turbine, it may easily be modified for use with numerous fluid flow systems. Accordingly, the scope of the present invention is defined not by the particular embodiments disclosed herein but by the scope of the appended claims.

What is claimed is:

1. A fluid flow control system, comprising:
(A) a fluid control valve, the flow of fluid through said valve varying as a function of the position of said valve;
(B) valve adjust means for adjusting the position of said control valve as a function of a valve position signal; and
(C) control means for generating a new said valve position signal during each of a plurality of sampling intervals N, said control means generating said valve position signal by:
(1) computing, during each successive sampling interval N, the rate of flow of fluid through said valve as a function of the position of said valve and in accordance with the static flow equation for said valve; and
(2) generating said new valve position signal as a function of the difference between a desired flow and said computed flow and in accordance with a non-linear control transfer function which limits said valve position signal, and therefore limits the change in position of said valve between the present sampling interval N and the following sampling interval N+1, to a value which ensures that the actual flow of fluid through said valve during said following sampling interval N+1 is substantially equal to the flow predicted by said static flow equation.

2. The fluid flow control system of claim 1, wherein said control means carries out a non-recursive algorithm.

3. The fluid flow control system of claim 2, wherein said valve adjust means comprises:
a hydraulic piston having a piston arm, the position of said piston arm determining the position of said valve; and servo means for controlling the flow of piston fluid into and out of said piston, and thereby controlling the position of said piston arm, as a function of said valve position signal and the actual position of said valve.

4. The fluid flow control system of claim 3, wherein said hydraulic piston carries out an integration of said control signal.

5. The fluid flow control system of claim 3, wherein said servo means comprises:
difference signal generating means for generating a difference signal indicative of the difference between the desired position of said valve indicated by said valve position control signal and the actual position of said valve; and
servo valve means for controlling the flow of fluid into and out of said piston as a function of said difference signal.

6. The fluid flow control system of claim 1, wherein said control means computes said flow of fluid during each successive sampling interval N as a function of the position of said valve at the beginning of that said sampling interval during which said computation is being made.

7. The fluid flow control system of claim 1, wherein said control means computes said flow of fluid through said valve as a function of the pressure across said valve as well as the position of said valve.

8. The fluid flow control system of claim 7, wherein said control means computes said flow of fluid as a function of the pressure across said valve at the beginning of that said sampling interval during which said computation is being made.

9. The fluid flow control system of claim 7, wherein said control means computes said flow of fluid through said valve as a function of the density of said fluid as well as a function of both the pressure across said valve and the position of said valve.

10. The fluid flow control system of claim 1, wherein said static flow equation is:

$$Q = K \cdot C_v \cdot \sqrt{\Delta P}$$

wherein K is a constant determined by the geometry of said valve, and $C_v = \alpha x^2$, wherein $\alpha$ is a constant determined by the geometry of said valve and x is the position of said valve and $\Delta P$ is the pressure difference across said valve.

11. A fluid flow control system, comprising:
(A) a fluid control valve, the flow of fluid through said valve varying as a function of the position x of said valve;
(B) valve adjust means for adjusting the position of said control valve as a function of a valve position signal, and
C. control means for generating a new said valve position signal during each of a plurality of sampling intervals N, said control means generating said valve position signal by:
(1) computing the desired change $\Delta x$ in the position of said valve between the present time sampling interval N and the following sampling interval N+1 as a function of the difference between said desired flow and said computed flow and in accordance with a non-linear transfer function, said non-linear transfer function limiting the size of said desired change $\Delta x$ to a value which ensures that the actual rate of flow through said valve during the said following sampling interval N+1 is substantially equal to the flow predicted by said static equation;
(2) determining the desired position of said valve during said following sampling interval N+1 by computing the sum of said desired change $\Delta x$ and the actual position of said valve; and
(3) generating said valve position signal as a function of said desired position of said valve indicated by said computed sum.

12. The fluid flow system of claim 11, wherein said desired change $\Delta x$ is computed in accordance with the following equations, said equations defining said non-linear control transfer function:

$$\Delta x = [K_I \cdot T \cdot Er(N)] \cdot Kn \quad \text{for} \quad -E\max \leq Er(N) \leq +E\max$$

$$\Delta x = +Kn\Delta x_{max} \quad \text{for } Er(N) > +E\max$$

$$\Delta x = -Kn\Delta x_{max} \quad \text{for } Er(N) < -E\max,$$

wherein $K_I$ is a constant, T is the length of said sampling interval, Er(N) is the difference between said desired and said computed flow, $+\Delta x_{max}$ and $-\Delta x_{max}$ are preselected maximum positive and negative error values, $+E\max = +\Delta x_{max}/K_I$ and $-E\max = -\Delta x_{max}/K_I$, and Kn is a variable whose magnitude decreases as said valve position increases.

13. The fluid flow system of claims 1 or 11, wherein said fluid control valve adjusts the flow of fluid to a gas turbine and where said desired flow is computed by multiplying the actual speed of said turbine by a fuel reference signal.

14. A fluid flow control system, comprising:
(A) M fluid control valves, M being a positive integer, the flow of fluid through each respective said valve varying as a function of its position;
(B) M valve adjust means, each of said valve adjust means being associated with a respective said valve and adjusting the position of its associated valve as a function of P valve position signals associated with its associated valve, P being a positive integer;
(C) P control means, each of said control means for generating M said valve position signals during each of a plurality of sampling intervals N, each of said valve position signals being associated with and representative of the desired position of a respective one of said valves during the next sampling interval N+1, each of said control means generating each of said M valve position signals by:
(1) computing, during each successive sampling interval N, the flow of fluid through said valve with which said position signal is associated as a function of the position of said valve with which said position signal is associated and in accordance with the static flow equation for said valve with which said position signal is associated; and
(2) generating said valve position signal as a function of the difference between a desired flow of fluid through said valve with which said position signal is associated and said computed flow of fluid through said valve with which said position signal is associated and in accordance with a non-linear control transfer function which limits each of said valve position signals, and therefore limits the change of position of said valve with which said position signal is associated between the present sampling interval N and the following sampling interval N+1 to values which ensure that the actual flow of fluid through said valve with which said position signal is associated during said following sampling interval N+1 is substantially equal to the flow predicted by said static flow equation for said valve with which said position signal is associated.

15. The fluid flow control system of claim 14, wherein each of said control means carries out a non-recursive algorithm.

16. The fluid flow control system of claim 15, wherein each of said valve adjust means comprises:

a hydraulic piston having a piston arm, the position of said piston arm determining the position of said valves with which said valve adjust means is associated; and servo means for controlling the flow of piston fluid into and out of said piston, and thereby controlling the position of said piston arm, as a function of (1) said valve position signals associated with said valve adjust means and (2) the actual position of said valve with which said valve adjust means is associated.

17. The fluid flow control system of claim 16, wherein each of said hydraulic pistons carries out an integration of said control signals associated with the valve adjust means of which it forms a part.

18. The fluid flow control system of claim 14, wherein each of said control means computes said flow of fluid through each of said valves during each successive sampling interval N as a function of the position of said valves at the beginning of that sampling interval during which said computation is being made.

19. The fluid flow control system of claim 14, wherein each of said control means computes said flow of fluid through each of said valves as a function of the pressure across each respective valve as well as the position of each respective valve.

20. The fluid flow control system of claim 19, wherein each of said control means computes said flow of fluid through each of said valves as a function of the pressure across each respective valve at the beginning of that sampling instant during which said computation is being made.

21. The fluid flow control system of claims 14 or 19, wherein each of said control means computes said fluid flow through each of said valves as a function of the density of said fluid through each of said respective valves as well as the function of both the pressure across and the position of each of said respective valves.

* * * * *